United States Patent
Aimi et al.

(10) Patent No.: US 12,542,449 B2
(45) Date of Patent: Feb. 3, 2026

(54) CHARGING STATION SYSTEM IN AN ELECTRIC VEHICLE MANAGEMENT SYSTEM

(71) Applicant: Rivian IP Holdings, LLC, Irvine, CA (US)

(72) Inventors: Roberto Mario Aimi, San Francisco, CA (US); Michael Nathaniel Rosenblatt, Boulder, CO (US)

(73) Assignee: Rivian IP Holdings, LLC, Irvine, CA (US)

( * ) Notice: Subject to any disclaimer, the term of this patent is extended or adjusted under 35 U.S.C. 154(b) by 739 days.

(21) Appl. No.: 17/847,065

(22) Filed: Jun. 22, 2022

(65) Prior Publication Data

US 2023/0420976 A1 Dec. 28, 2023

(51) Int. Cl.
*H02J 7/00* (2006.01)
*B60L 53/16* (2019.01)
*B60L 53/60* (2019.01)

(52) U.S. Cl.
CPC ........ *H02J 7/007188* (2020.01); *B60L 53/16* (2019.02); *B60L 53/60* (2019.02); *H02J 7/0042* (2013.01)

(58) Field of Classification Search
CPC ... H02J 7/007118; H02J 7/0042; B60L 53/60; B60L 53/16
USPC ....................................................... 320/109
See application file for complete search history.

(56) References Cited

U.S. PATENT DOCUMENTS

| | | | |
|---|---|---|---|
| 2013/0134933 A1* | 5/2013 | Drew | B60L 53/31 361/103 |
| 2016/0159231 A1* | 6/2016 | Jefferies | B60L 53/60 320/109 |
| 2016/0207409 A1* | 7/2016 | Ueo | B60L 50/16 |
| 2018/0354383 A1* | 12/2018 | Namou | B60L 53/124 |
| 2021/0237605 A1* | 8/2021 | Ando | B60L 53/16 |
| 2022/0410752 A1* | 12/2022 | Plasterer, II | H01R 31/065 |
| 2023/0191926 A1* | 6/2023 | Cretin | H01R 13/5213 439/589 |

OTHER PUBLICATIONS

"Ask An Expert—Can touch sensors be used with Gloves?", Time 2.52, https://www.youtube.com/watch?v=8jbd7n7Plss, Sep. 6, 2016.
(Continued)

*Primary Examiner* — Suchin Parihar
(74) *Attorney, Agent, or Firm* — Foley & Lardner LLP

(57) ABSTRACT

Disclosed are embodiments for ensuring that an electric vehicle has initiated stopping of a charging process between a charging station and an electric vehicle (EV) before a coupler of the charging station and the EV are mechanical decoupled. The charging station includes a sensor assembly includes any suitable sensor that generates a sensor signal indicative of detection of an external object before the external object contacts the coupler. In response to receiving the sensor signal, a relay controller provides a charging control signal to an electric vehicle charge controller to initiate stopping of a charging process before a latch mechanically decouples the coupler from the vehicle. Providing the control signal comprises actuating a relay to modify a resistance across a corresponding electric path, the resistance modification being detected by the vehicle charge control to initiate stopping of a charging process.

17 Claims, 10 Drawing Sheets

(56) References Cited

OTHER PUBLICATIONS

SAE International, "SAE Electric Vehicle and Plug in Hybrid Electric Vehicle Conductive Charge Coupler", Surface Vehicle Recommended Practice, J1772™ Jan. 2010, pp. 1-51.

* cited by examiner

CHARGING STATION SYSTEM IN AN ELECTRIC VEHICLE MANAGEMENT SYSTEM

INTRODUCTION

Vehicle drivers may rely on charging stations to power electric vehicles not otherwise powered by traditional fuel. Charging stations may deliver electric power to an electric vehicle to facilitate completion of transportation tasks. For example, charging stations may support manual charging, whereby a driver manually connects their EV to the charging station system.

SUMMARY

Various aspects of the technology described herein are generally directed to systems, methods, and computer storage media for, among other things, providing a charging station system configured to communicate a sensor signal that indicates detection of an external object before or when the external object contacts a coupler of the charging station system. The sensor signal—indicating detection of the external object—is used to initiate stopping of a charging process. In particular, based on the sensor signal, the charging station system (i.e., a charging station) provides a charging control signal, via the coupler, to an electric vehicle charge controller; and based on the charging control signal, the electric vehicle charge controller initiates stopping of a charging process before a latch of the coupler mechanically decouples the coupler from the electric vehicle. The charging control signal may include an indication of a change in an electric property (e.g., resistance, voltage, or current) across a corresponding electric path, as discussed herein. In this manner, aspects of the technology described herein facilitate ensuring that electric current has stopped flowing between the coupler of the charging station and the electric vehicle when a driver manually pulls the coupler away from the electric vehicle to mechanically decouple the coupler from the electric vehicle.

By way of context, charging stations may be removably coupled from electric vehicles by way of a coupler of the charging station. A driver may manually decouple the coupler from the electric vehicle by depressing a button on the coupler to trigger a switch and the locking mechanism. Drivers may more quickly mechanically disengage a coupler from an electric vehicle. In some instances, a driver may pull the coupler away from the electric vehicle before the charging process has stopped (e.g., before 100 ms have elapsed from the time the driver depressed the button). Such quick disengagement of the coupler from the electric vehicle may create arcing, which overtime may increase the resistance of the coupler leads and may reduce the charging efficiency and speed of the charging station and electric vehicle.

In one embodiment, a coupler selectively couples a charging station and a vehicle. The coupler may include a sensor assembly that detects an external object before the external object contacts the coupler. The coupler may include a relay controller that receives, from the sensor assembly, a sensor signal indicating the detection of the external object and used to provide a charging control signal to an electric vehicle charge controller. Based on the charging control signal, the electric vehicle charge controller initiates stopping of a charging process before a latch mechanically decouples the coupler from the vehicle.

In another embodiment, a charging station system includes a coupler that complies with an SAE J1772 standard and that selectively couples to a vehicle. The charging station system may include a sensor assembly that detects an external object before the external object contacts the coupler. The charging station system includes a relay controller that receives, from the sensor assembly, a sensor signal being indicative of the detection of the external object and used to provide a charging control signal to an electric vehicle charge controller to initiate stopping of a charging process before a latch mechanically decouples the coupler from the vehicle.

In yet another embodiment, a coupler couples to a vehicle to initiate a charging process. The coupler may include a latch configured to selectively couple to the vehicle. The coupler may include a switch engageable to modify a resistance across a corresponding electric path. The modification of the resistance is detectable by an electric vehicle charge controller to initiate stopping of the charging process. The coupler may include a button that engages the switch in response to the button being depressed, such that depressing the button releases the latch to allow removal of the coupler from the vehicle. The coupler may include a mechanical assembly that delays depression of the button.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1:
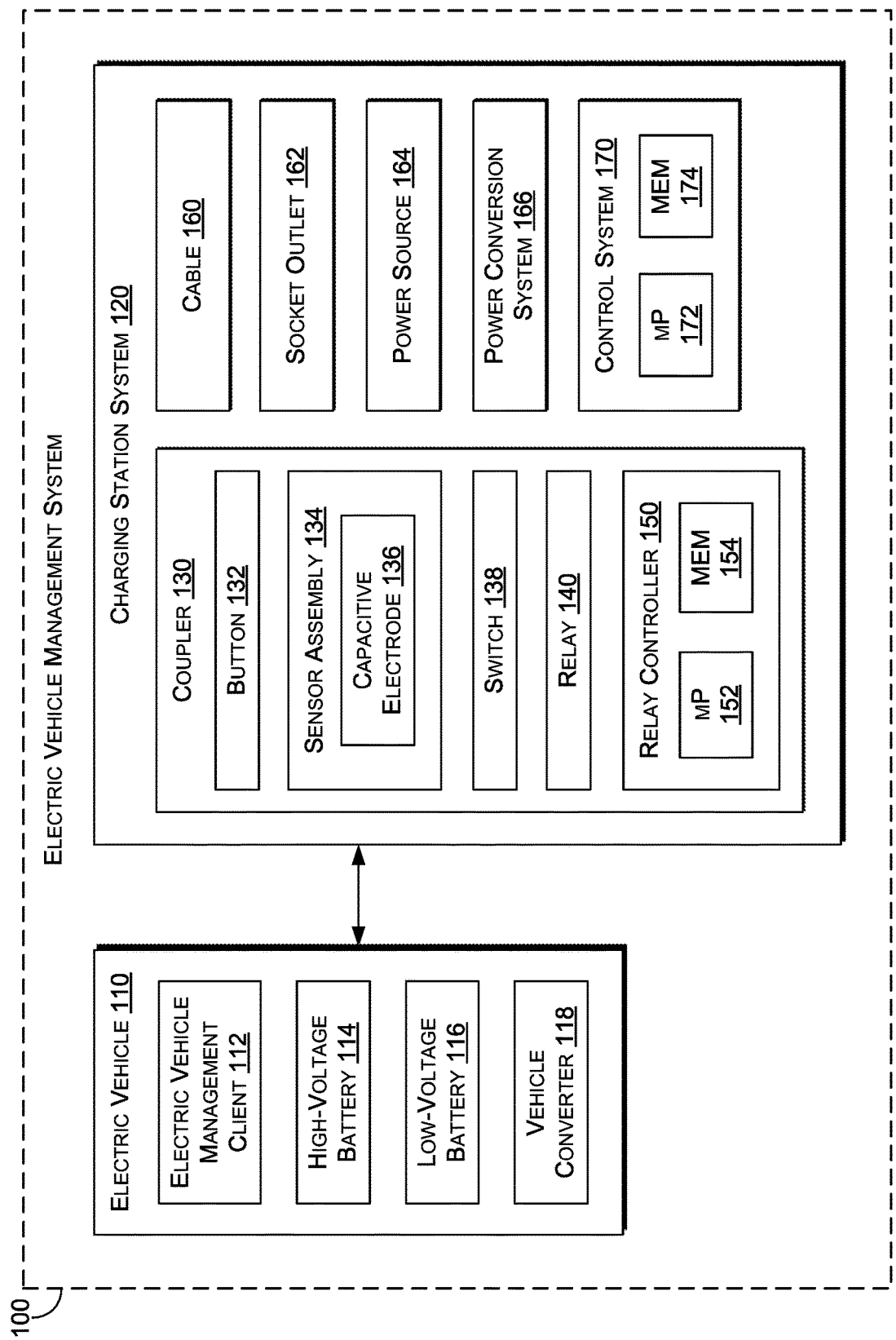
FIG. 1 is a block diagram of an exemplary schematic of a charging station system that includes a coupler configured to electrically decouple before mechanically decoupling from an electric vehicle in an electric vehicle management system, in accordance with aspects of the technology described herein.

Vehicle management systems support a network of resources and services to ensure convenient vehicle operations. A charging station system (i.e., a charging station) of a vehicle management system can operate as part of the electric vehicle (EV) management system to provide powering, charging, tune-up, or other suitable EV services. In particular, the charging station system may deliver electric power to an electric vehicle for transportation tasks. For example, the charging station system may support manual charging, whereby a driver manually connects their EV to the charging station system.

Charging stations are not configured with an electromechanical infrastructure and control logic to support initiating stopping of a charging process before the coupler becomes removable from the electric vehicle. In particular, charging stations fail to ensure that electric current is not flowing through a connection between the charging station system—more specifically a coupler of the charging station system—and an electric vehicle when a driver mechanically disconnects the coupler from the electric vehicle. For example, charging stations may include a coupler positioned at the end of a charging cord of the charging station. Typically, the coupler includes a button that, when depressed, triggers (1) a switch that decouples (e.g., electrically decouple) an electrical terminal of the coupler from an electrical terminal of the electric vehicle, as well as (2) a locking mechanism, such as a latch, that mechanically decouples (e.g., unlatches or disengages the latch) the coupler from the electric vehicle. It may take less than one second (e.g., about 100 ms) from the time the button is depressed until the electrical current stops flowing between the electric vehicle and the charging station. This timing is due, at least in part, to the time it takes the electric vehicle charge controller to detect the change in resistance (or current), initiate stopping of the charging process, and stop the flow of current between the charging station system and electric vehicle.

As drivers become more comfortable with the charging process, these drivers may more quickly mechanically disengage the coupler from the electric vehicle. In some instances, a driver may pull the coupler away from the electric vehicle before 100 ms have elapsed from the time the driver depressed the button. Such quick disengagement of the coupler from the electric vehicle may create arcing, since the charging process may not have stopped at the moment the coupler disconnects from the electric vehicle. Over time, such arcing may lead to challenges in the charging station system including: wear on the electric terminals of the charging station; increase (or reduction) in the resistance of the coupler leads, and reduction in the charging efficiency and speed of the charging station and electric vehicle. Moreover, as a result of this wear on the electric terminals of the charging station systems and the electric vehicles, the rate of part replacement and the costs for servicing the charging stations and the electric vehicles may undesirably increase. As such, a more comprehensive electric vehicle management system—with an alternative basis for more quickly detecting an external object to earlier initiate stopping of the charging process between the charging station system and the EV—can improve hardware longevity and reduce arcing in charging station systems.

Embodiments described herein are generally directed to systems, methods, and computer storage media for, among other things, providing a charging station system configured to communicate a sensor signal that indicates detection of an external object at least before the external object contacts a coupler of the charging station system. The sensor signal—indicating detection of the external object—is used to initiate stopping of a charging process. In particular, based on the sensor signal, the charging station system (i.e., a charging station) provides a charging control signal, via the coupler, to an electric vehicle charge controller; and based on the charging control signal, the electric vehicle charge controller initiates stopping of a charging process before a latch of the coupler mechanically decouples the coupler from the electric vehicle. In this manner, aspects of the technology described herein facilitate ensuring that electric current has stopped flowing between the coupler of the charging station and the electric vehicle when a driver manually pulls the coupler away from the electric vehicle to mechanically decouple the coupler from the electric vehicle.

Operationally, a charging station system that includes a coupler is provided. The coupler electrically (e.g., a closed circuit) and mechanically (e.g., a latch) couples the charging station system to an electric vehicle system to initiate a charging process. The charging station system includes a sensor assembly communicatively coupled to a relay controller that receives a sensor signal indicative of the external object (e.g., a hand of the driver, a robotic hand, and the like) before the external object contacts the coupler (e.g., to remove the coupler). In response to receiving the sensor signal, the relay controller may provide a charging control signal (e.g., an indication of a change in resistance or some other electric property) to an electric vehicle charge controller to initiate stopping of the charging process.

The coupler includes a relay, a switch, and a button to support stopping the charging process prior to unlatching the coupler. The sensor assembly provides the charging control signal that triggers the relay to modify a resistance across a corresponding electric path associated with the charging process. The electric vehicle charge controller detects the resistance modification to initiate stopping of a charging process. The relay preemptively initiates stopping of the charging process, ahead of the switch and button engaging the electric path that is shared with the relay. In particular, the relay can be connected (e.g., in series) to the switch, and the switch can be engaged when the button is manually depressed. After the relay has already modified the resistance across the electric path, manually depressing the button, first, causes the switch to be engaged, across the same electric path and, second, causes the latch to be released to allow the coupler to be removed from the electric vehicle. In this way, the relay controller causes the relay to modify the resistance, the electric vehicle controller detects the modified resistance to initiate stopping of the charging process before a driver touches the coupler (e.g., before the driver manually depresses the button to engage the switch and release the latch) to manually remove the coupler from the electric vehicle.

Aspects of the technical solution can be described by way of examples and with reference to FIG. 1. FIG. 1 illustrates an electric vehicle management system 100 that includes an electric vehicle 110. In one embodiment, the electric vehicle management system 100 may correspond to the electric vehicle system 500 of FIG. 5. As illustrated, the electric vehicle 110 may include an electric vehicle management client 112, a high-voltage battery 114, a low-voltage battery 116, and a vehicle converter 118. In an embodiment, the electric vehicle management system 100 includes a charging station system 120 that is capable of charging the electric vehicle 110. The charging station system 120 (also referred to herein as "EV charger", "electric vehicle supply equipment (EVSE)", or "charging station") may include a piece of equipment that supplies electric power for charging electric vehicles 110.

Figure 2A:
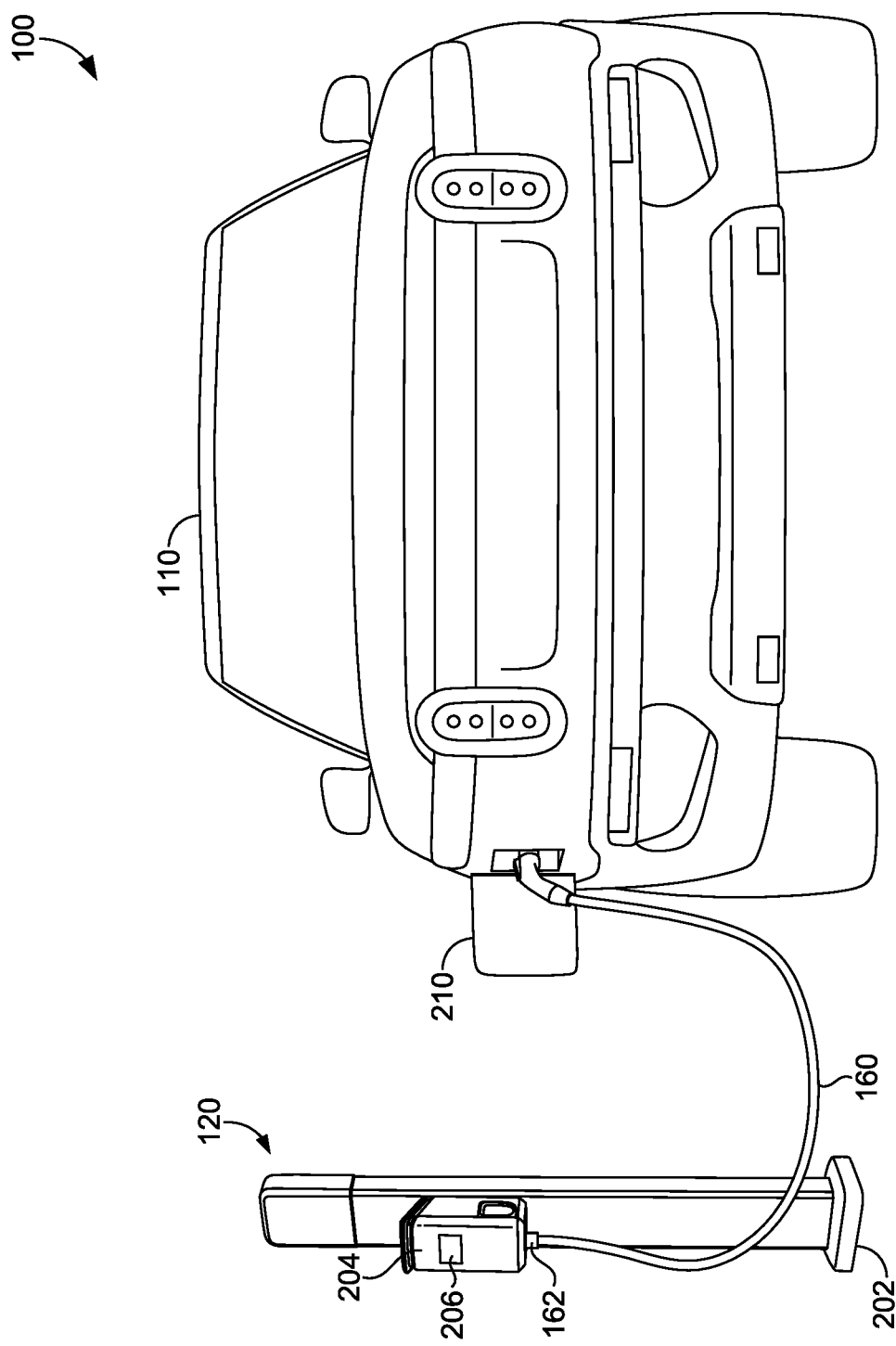
FIG. 2A a schematic diagram of an exemplary charging station system electrically and mechanically coupled to an electric vehicle by way of the coupler of the charging station system in an electric vehicle management system, in accordance with aspects of the technology described herein.
Figure 2C:
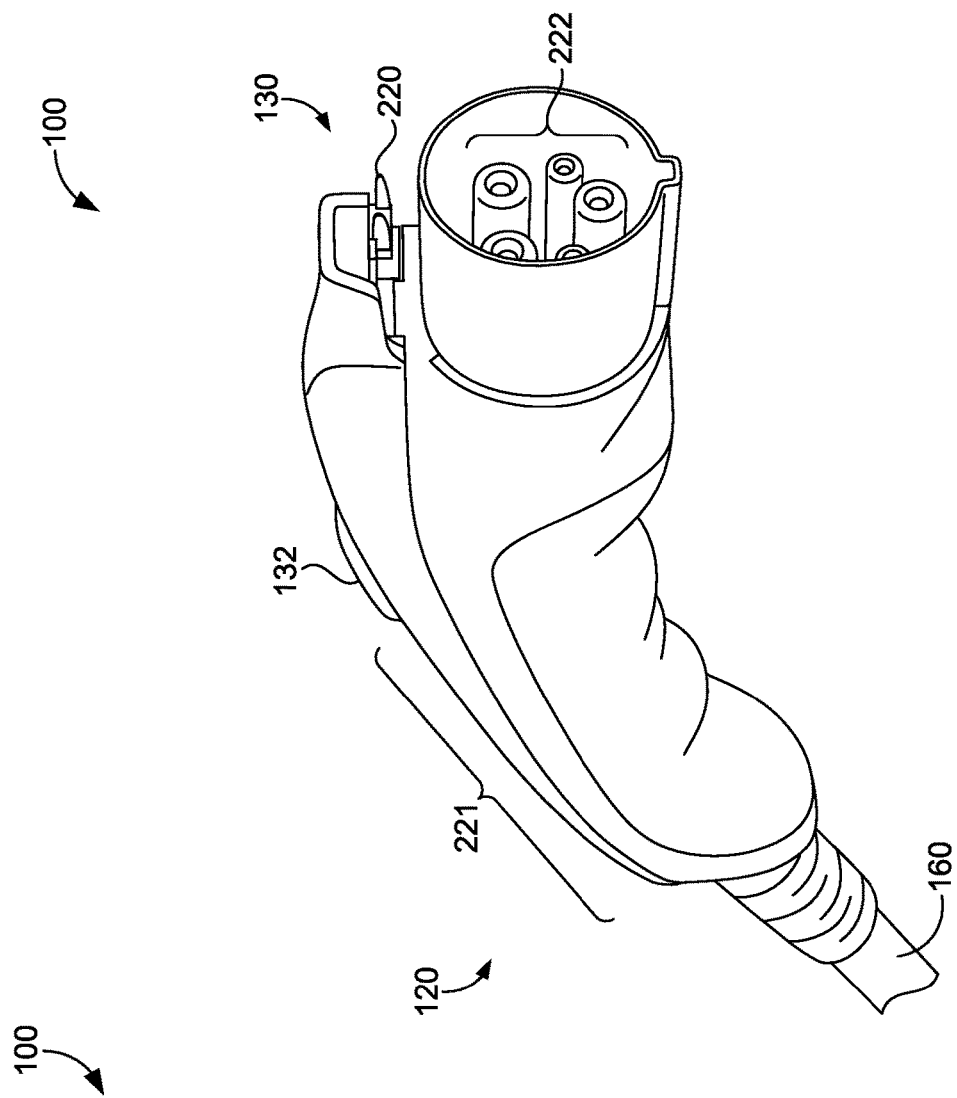
FIG. 2C is a schematic diagram of an exemplary coupler in an electric vehicle management system, in accordance with aspects of the technology described herein.
Figure 2B:
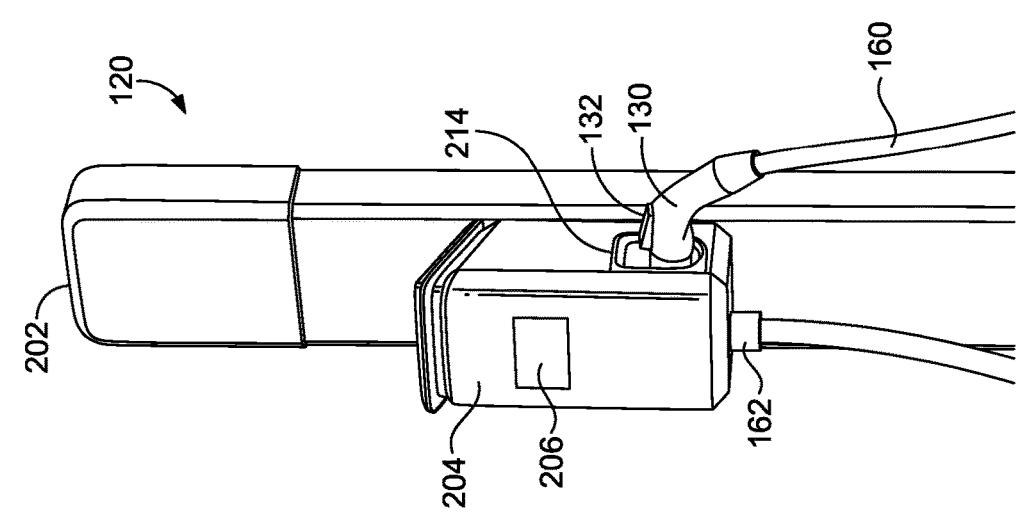
FIG. 2B is a schematic diagram of an exemplary charging station system including the coupler in an electric vehicle management system, in accordance with aspects of the technology described herein.
Figure 2D:
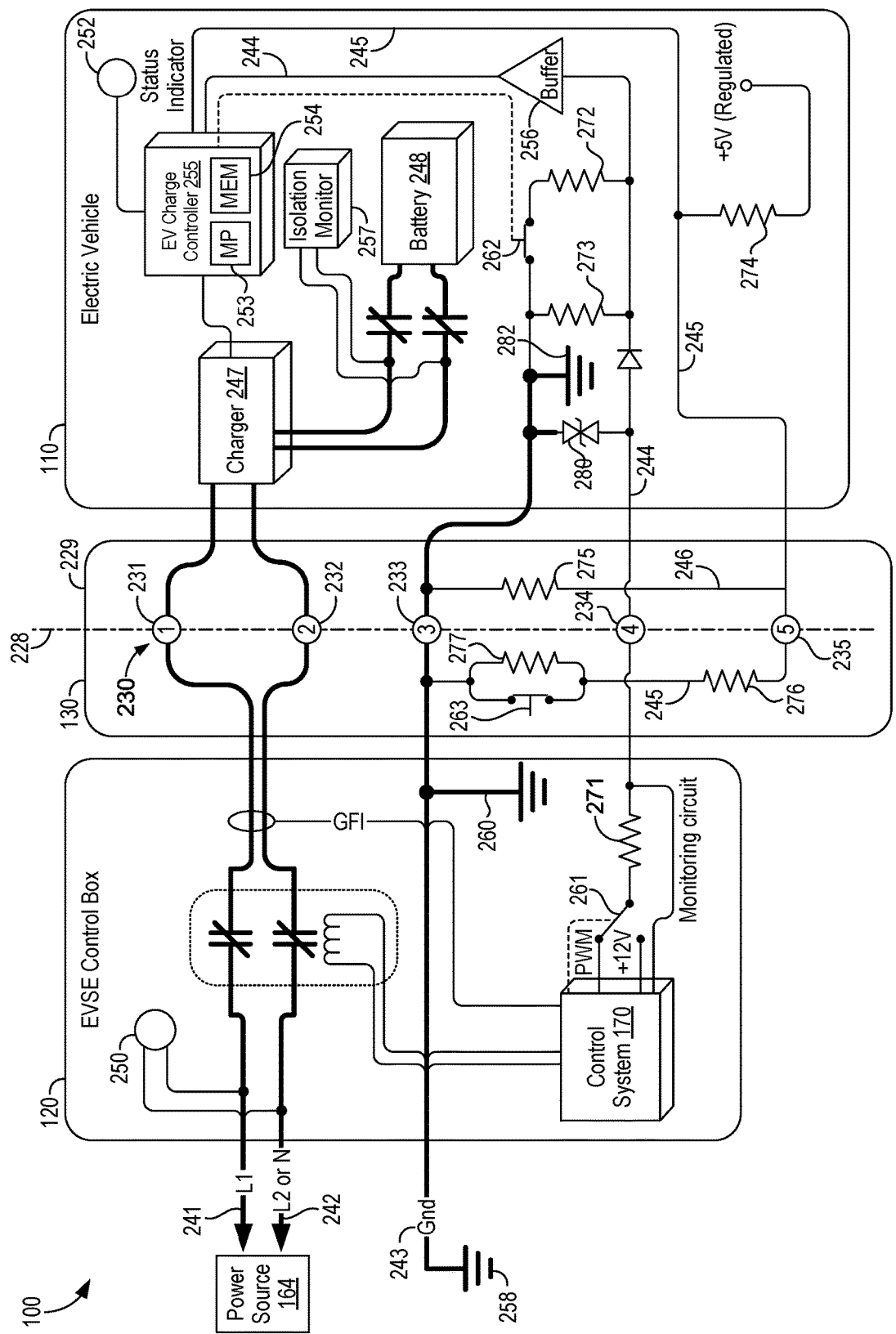
FIG. 2D is an electric block diagram of an exemplary coupler in an electric vehicle management system, in accordance with aspects of the technology described herein.

To facilitate charging, the charging station system 120 may include a coupler 130 configured to directly engage with the electric vehicle 110 during the charging process, as described in detail with regard to FIG. 2D. In an embodiment, the coupler 130 includes a button 132 (or any suitable depressible mechanism), a sensor assembly 134, a capacitive electrode 136, a switch 138, a relay 140, and a relay controller 150 that includes a processor 152 and a memory device 154. Additionally, in an embodiment, the charging station system 120 includes a cable 160, a socket outlet 162, a power source 164, a power conversion system 166, and a control system 170 that includes a processor 172 and a memory device 174.

As used herein, "coupler," "coupler system," and "charging station coupler" refers to the portion of the charging station that is configured to interface with the electric vehicle to facilitate and control charging of the electric vehicle. The coupler may include a sensor assembly, a relay controller, a button (or any other suitable depressible mechanism), a switch, and a relay, among other electromechanical components.

The sensor assembly 134 of the coupler may be communicatively coupled to the relay controller. The sensor assembly may include any suitable proximity sensor, force sensor, capacitive electrodes, accelerometers, touch sensors, and/or any sensor capable of detecting the presence of an external object, such as a driver's hand, before the external object (e.g., hand) engages the button. The sensor assembly 134 may communicate a sensor signal indicative of the detection of the external object to the relay controller. In response to receiving the sensor signal, the relay controller may provide a charging control signal to a vehicle charge controller to initiate stopping of a charging process before a latch mechanically decouples the coupler from the electric vehicle.

The relay may be connected (e.g., in parallel or in series) to the switch. In instances in which the switch remains closed (e.g., to close the circuit), the relay may be positioned in series with the switch. As a result of this arrangement, the relay controller may engage the relay to cause a modification in resistance that is detected by the electric vehicle charge controller to initiate stopping of the charging process before a driver has a chance to contact the coupler to mechanically decouple the coupler of the charging station system from the electric vehicle. As a result, the performance of the charging station may be maintained, arcing may be prevented, electric vehicle and charging station part replacement may be reduced, and the reduction of charging efficiency due to arcing may be eliminated.

In more detail, the electric vehicle 110 may be charged by applying a charging voltage to the high-voltage battery 114.

In some instances, the electric vehicle management client 112 may manually engage with the charging station system 120 to electrically and mechanically couple the charging station system 120 and the electric vehicle 110. As used herein, electric vehicle management client 112 may refer to a personnel, automatic controller (e.g., a robot automatically controller or remote controlled robot) or user who engages with the electric vehicle 110 or the charging station system 120.

During the charging process, the electric vehicle management client 112 may drive the electric vehicle 110 to a charging station system 120 and manually connect the charging station system 120 to the electric vehicle 110. For example, the charging station system 120 may deliver high voltage to the high-voltage battery 114. The high-voltage battery 114 may include a deep-cycle battery. Certain electric vehicles 110 may include at least one vehicle converter 118 to convert the high-voltage of the high-voltage battery 114 to the low-voltage battery 116. In one embodiment, the low-voltage battery 116 may include a 12-volt battery.

To facilitate voltage conversion from the charging station system 120, as well as between the high-voltage battery 114 and the low-voltage battery 116, the vehicle converter 118 may include circuitry for stepping voltage up or down and/or converting voltage between alternating current (AC) and direct current (DC). In one embodiment, the vehicle converter 118 includes a AC/DC converter that converts AC current from the charging station system 120 to high-voltage DC current. In one embodiment, the vehicle converter 118 includes a DC/DC converter that converts high-voltage DC current to low voltage (e.g., 12-V) DC current. In one embodiment, the vehicle converter 118 includes an auxiliary inverter that converts DC current to AC current. It should be understood that in some embodiments, the electric vehicle 110 may include additional or alternative components, such as coolant, printed circuit boards, and so forth.

Although the current electric vehicle 110 is discussed in the context of being operated by an electric vehicle management client 112, it should be understood that the embodiments described herein are not limited to manually operated electric vehicles. Indeed, the embodiments described herein may be employed for other vehicles, such as hybrid vehicles, autonomous vehicles, semi-autonomous vehicles, and other device capable of transporting cargo and passengers, such as trains, planes, and the like.

The charging station system 120 may include a coupler 130 configured to couple the charging station system 120 to the electric vehicle 110 to initiate a charging process. In one embodiment, the coupler 130 of the charging station system 120 includes an electric terminal configured to mate with an electric terminal of the electric vehicle 110 to deliver voltage to the high-voltage battery 114, the low-voltage battery 116, or both as described above. The coupler 130 may comply with any suitable regional standard. For example, the coupler 130 may comply with any of the following standards: SAE Surface Vehicle Recommended Practice J1772, SAE Electric Vehicle Conductive Charge Coupler (hereinafter referred to as the "SAE J1772" standard or the "IEC 62196 Type 1" standard), a CHAdeMO standard, an International Electrotechnical Commission 62196 standard, (e.g., IEC 62196 Type 2 coupler), or a Combined Charging System (CCS), to name a few. However, it should be understood that the embodiments disclosed herein are applicable to other charging station technical standards.

In one embodiment, the coupler 130 includes a button 132 that may receive an input (e.g., from the electric vehicle management client 112) to disengage the coupler 130 from the electric vehicle 110. In an embodiment, the input to the button 132 may release a locking mechanism, such as a latch, to enable the coupler 130 to mechanically decouple from the electric vehicle 110, as discussed below. Although the embodiment disclosed herein are discussed in the context of a button, it should be understood that the embodiments disclosed herein may be employed in association with any other depressible mechanism or may be employed in the absence of a button.

In an embodiment, the coupler 130 may include a sensor assembly 134. The sensor assembly 134 may include any suitable sensor configured to detect an external object, such as a hand of the electric vehicle management client 112. For example, the sensor assembly 134 may include a capacitive electrode 136 configured to detect and communicate a sensor signal indicative of detection of a non-metallic object having a dielectric constant difference from air, such as the hand of the electric vehicle management client 112. The capacitive electrode 136 may detect the external object by employing an electrostatic field. In some embodiments, the capacitive electrode 136 may be communicatively coupled to any suitable integrated circuit (IC), such as an application-specific IC (ASIC) controller, a digital signal processor (DSP), and the like. In this manner, the raw sensor signal from the capacitive electrode can be converted into processable data. Other sensor assemblies are capable of using capacitive sensing such as sensors that detect and measure proximity, pressure, force, humidity, fluid levels, acceleration, or position and displacement, among others.

Although this example is discussed in the context of a capacitive electrode, it should be understood that additional sensor assemblies may be employed to detect the external object. For example, in one embodiment, the sensor assembly 134 includes an electro-mechanical switch that includes a sensitive micro-switch that changes between states when a mechanical actuator (such as the button 132 described herein) is displaced by the detected external object. In one embodiment, the sensor assembly 134 includes a pneumatic sensor that utilizes compressed air and a diaphragm valve to detect presence of an external object. For example, compressed air may be exhausted from an orifice until the target blocks the air from being exhausted, causing a change in air pressure that may be detected by the downstream diaphragm to produce a sensor signal.

In an embodiment, the sensor assembly 134 includes a magnetic sensor configured to detect the presence of a permanent magnet, such as one associated with a robotic hand, within a sensing range. A magnetic sensor may employ a reed detector, a Hall effect transducer, and the like, to detect the presence of a magnetic field that produces a change in state, which is communicated as a sensor signal. In an embodiment, the sensor assembly 134 includes an inductive sensor configured to detect a metallic external object causing a disruption in an electromagnetic field emanating from the inductive sensor. It should be understood that the aforementioned sensor list is not an exhaustive list of sensors that form the sensor assembly 134, since additional or alternative sensors, include those described above, either alone or in any combination, may be included in the sensor assembly 134.

The coupler 130 may include a switch 138. As used herein, "switch" "electric switch," "electrical switch," or "circuit breaker" may refer to an electrical component that is engageable to connect or disconnect the conducting path in an electrical circuit. In this manner, the switch 138 may interrupt the electric current (e.g., by changing a resistance across an electric path), or divert the electric current from one conductor to another. For example, the switch 138 may include one or more movable electrical contacts connected to external circuits, such that when a pair of contacts are touching current can pass between the contacts, while current is unable to pass between a pair of contacts that are separated (e.g., not touching). An example switch 138 includes a toggle switch, a rotary switch, a mercury switch, a push-button switch, a reversing switch, and the like. As used herein, "toggle," "actuate," and "engage", when discussed in the context of the switch 138 refer to the process of connecting or disconnect the conducting path in an electrical circuit to control the flow of current, as described above.

Figure 3A:
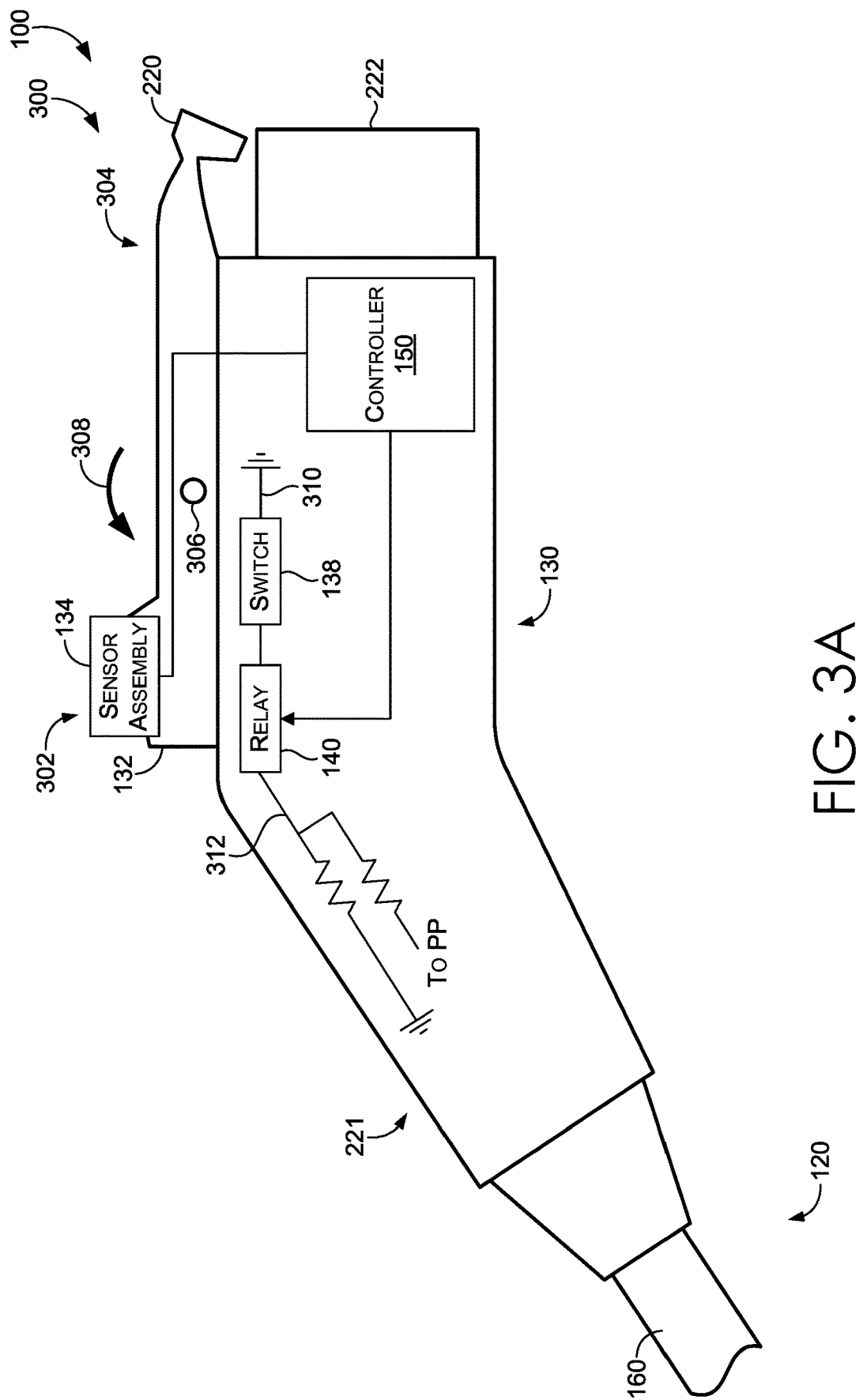
FIG. 3A is a schematic diagram of internal components of the coupler arranged in a first configuration within an electric vehicle management system, in accordance with aspects of the technology described herein.
Figure 3B:
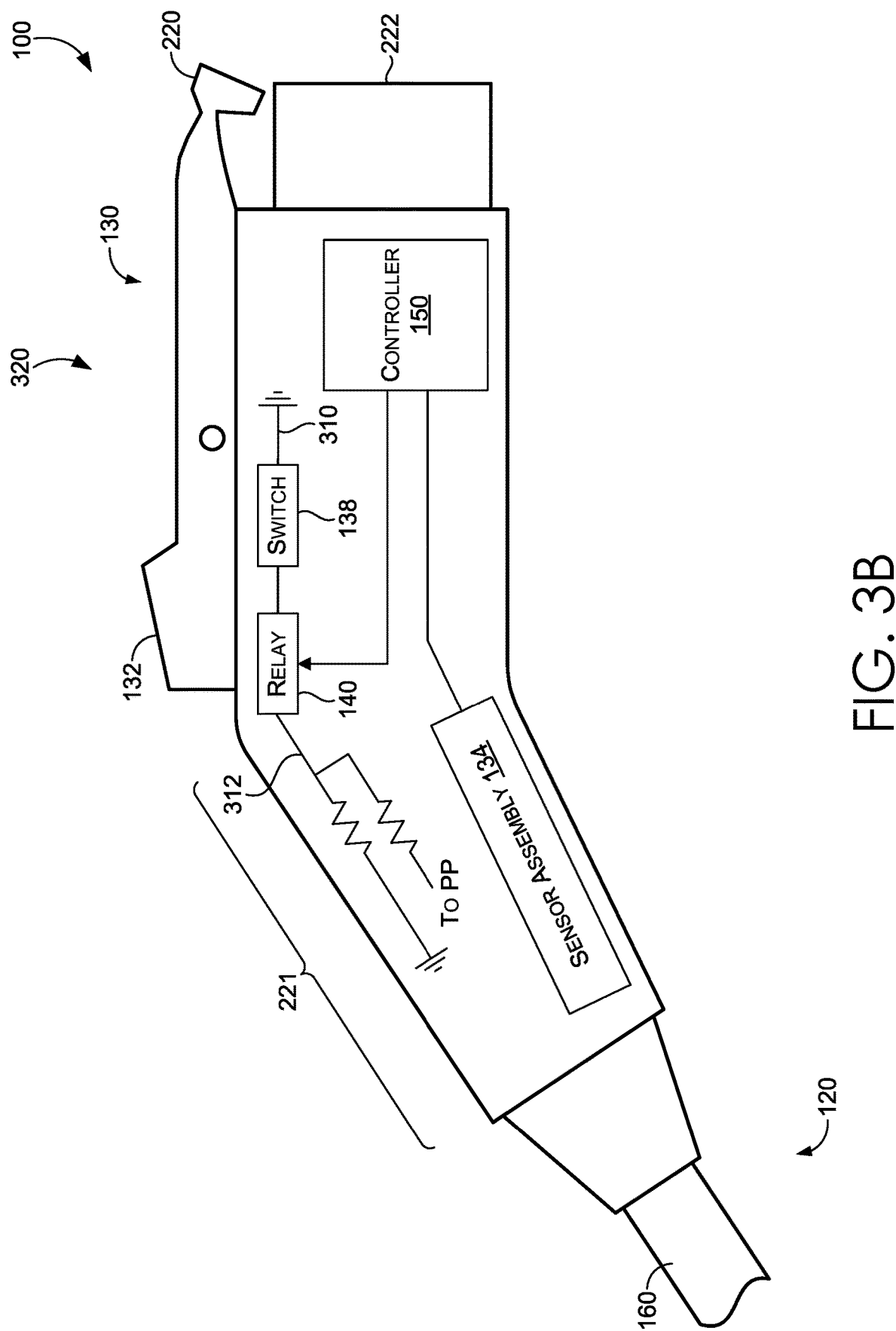
FIG. 3B is a schematic diagram of internal components of the coupler arranged in a second configuration within an electric vehicle management system, in accordance with aspects of the technology described herein.

In an embodiment and as discussed below with respect to FIGS. 3A-3C, the switch 138 may be connected in series (or parallel) to a relay 140. Although the switch 138 is illustrated in FIGS. 3A and 3B as downstream relative to the relay 140, it should be understood that the switch 138 may alternatively be positioned upstream relative to the relay 140. In embodiments in which the switch 138 remains closed (e.g., to close the circuit), the relay 140 may be positioned in series with the switch 138. The relay 140 may refer to an electrically operated switch configured to toggle between contact forms to control the flow of current within the coupler 130. The relay 140 may be actuated in response to receiving a charging control signal from the relay controller 150.

The relay controller 150 may receive the sensor signal from the sensor assembly 134 to send a charging control signal to the relay to modify a resistance across a corresponding electric path. The modification in resistance may be detected by the electric vehicle charge controller to initiate stopping of the charging process, for example, by stepping down the current, as described in more detail below. The relay controller 150 may include a processor 152 and a memory device 154.

Additionally, the charging station system 120 may include a cable 160 extending outward from the body of the charging station system 120. The cable 160 may include a conductive material capable of routing current from the charging station system to the electric vehicle 110. Additionally, the body of the charging station system 120 may include a socket outlet 162. The socket outlet 162 may refer to the port on the charging station system 120 that supplies charging power to the electric vehicle 110. The cable 160 may electrically connect the coupler 130 to the socket outlet 162. In an embodiment, the charging station system 120 includes a power source 164 from which the socket outlet 162 may deliver power to the cable 160 and then the coupler 130 for delivery to the electric vehicle 110. The power source 164 may include an energy sink receiving power from a solar panel, wind sources, nuclear sources, hydro sources, and the like.

The charging station system 120 may include a power conversion system 166 capable of converting incoming voltage to a voltage that can be used to charge the electric vehicle 110. In one embodiment, the power conversion system 166 includes an inverter, an on-board-charger, and/or a converter. The power conversion system 166 may receive voltage from a variety of sources, such as the power sources 164 discussed above. Thereafter, the power conversion system 166 may convert the current into a AC current that can be used to charge the electric vehicle 110.

The charging station system 120 may include a control system 170, including a processor 172 and a memory device 174. In one embodiment, the control system 170 may include computer logic to cause the charging system to efficiently receive voltage from the power source 164. Additionally or alternatively, the control system 170 may include computer logic to cause the power conversion system 166 to convert the received power into a voltage that can be delivered to the electric vehicle 110. It should be understood that the control system 170 may include any additional or alternative control logic to facilitate efficient operations of the electric vehicle management system 100.

Turning to FIG. 2A, illustrated is the charging station system 120 electrically and mechanically coupled to the electric vehicle 110 by way of the coupler 130 of the charging station system 120 in an electric vehicle management system 100, in accordance with aspects of the technology described herein. In some embodiments, the electric vehicle management client 112 (of FIG. 1) may manually remove the coupler 130 from the body 202 of charging station system 120 and manually connect the coupler 130 to the electric vehicle 110. The charging station system 120 may include a housing 204 (e.g., control box) that includes a display 206 configured to present a graphical user interface that may present instructions, feedback, or any suitable content to the electric vehicle management client 112.

A lid 210 of the electric vehicle 110 may open to allow access to the charging port of the electric vehicle 110. When the charging station system 120 is connected to the electric vehicle 110, a series electric connection may be formed between the socket outlet 162, the cable 160, the coupler 130, and the electric vehicle 110. Although in the illustrated embodiment the electric terminals of the electric vehicle 110 are accessible from the front, lateral side of the electric vehicle 110, the electric terminals of the electric vehicle 110 may be positioned on any side or portion of the electric vehicle 110.

FIG. 2B illustrates an exemplary charging station system 120 including the coupler 130 in an electric vehicle management system 100, in accordance with aspects of the technology described herein. Whereas the embodiment illustrated in FIG. 2A included the charging station system 120 coupled to the electric vehicle 110, FIG. 2B illustrates the charging station system 120 in an idle state (i.e., not charging the electric vehicle 110). The charging station system 120 may include an opening 214 that may receive the coupler 130. In one embodiment, the opening 214 may include a mechanism that may mechanically couple with the coupler 130. For example, the coupler 130 may include the button 132 that is depressible to disengage the coupler 130 from the mechanism in the opening 214. In this manner, depressing the button 132 allows the coupler 130 to be removed from the body 202 of the charging station system 120.

FIG. 2C is a schematic diagram of an exemplary coupler 130 in an electric vehicle management system 100, in accordance with aspects of the technology described herein. As discussed above, the coupler 130 may include a button 132 that, when engaged with, releases a latch 220 or any other suitable locking mechanism. The button 132 may move relative to a handle portion 221 of the coupler 130. The button 132 may be fixed with respect to the latch 220, such that movement of the button 132 may cause a corresponding movement of the latch 220. In one embodiment, the button 132 may be depressed (e.g., in response to a force being applied to the button 132) to cause the latch 220 to transition from an engaged state to an unengaged state. For example, when the button 132 is in a resting state (e.g., not depressed), the latch 220 may be engaged and un-removable relative to the component to which the latch 220 has locked. When the button 132 is depressed, the latch 220 may be removable relative to the component to which the latch 220 is locked. Depressing the button 132 may simultaneously engage the switch 138 (FIG. 1) as discussed herein.

The coupler 130 may include an electric terminal 222 arranged in any suitable manner for engaging with the electric vehicle 110 (FIG. 1). In one embodiment, the electric terminal 222 includes any number of terminal leads (e.g., five in the illustrated example) configured to mate and communicate with corresponding leads in the electric vehicle 110. Although the illustrated coupler 130 includes electrical terminals arranged in accordance with the SAE J1772 standard, it should be understood that the embodiments disclosed herein may be applied to a coupler having a terminal arrangement in accordance with any standard, including but not limited to the CHAdeMO standard, the IEC 62196 Type 2 standard, a Combined Charging System (CCS), and/or the like.

FIG. 2D is an electric block diagram of an exemplary coupler 130 in an electric vehicle management system 100, in accordance with aspects of the technology described herein. In one embodiment, the illustrated coupler 130 corresponds to the coupler 130 of FIG. 2C arranged in accordance with the SAE J1772 standard. To facilitate illustration, a vertical dashed line 228 is reproduced separating the electrical features of the coupler 130 (shown left of line 228) and a vehicle inlet 229 the electric vehicle 110 (shown right of line 228). Additionally, five points of connection are shown on the vertical line 228. Specifically, a first contact point 231, a second contact point 232, a third contact point 233, a fourth contact point 234, and a fifth contact point 235 (collectively referred to as "contact points 230").

In one embodiment, the connection points 230 correspond to pins or electric terminals configured to provide a connection between the electric vehicle 110 and the coupler 130. Electrical current and/or control signals may flow or be communicated between one or more of the contact points 230. Although the illustrated embodiment includes five contact points 230, it should be understood that the any number of contact points may exist between the coupler 130 and the electric vehicle 110.

By way of non-limiting example, a first electric path 241, a second electric path 242, and a third electric path 243 may allow for the flow of electric current between the coupler 130 and electric vehicle 110. As discussed in detail below, a fourth, fifth, and sixth electric path 244, 245, 246 may allow for the flow of electric current between the charging station system 120, the coupler 130, and/or the electric vehicle 110. As illustrated, the first, second, and third electric paths 241, 242, and 243 may intersect at the first, second, and third contact points 231, 232, and 233, respectively. When the coupler 130 is connected to the electric vehicle 110, the first and second electric paths 241 and 242 may allow for the flow of current from the power source 164 to a charger 247 and the battery 248 (e.g., the high-voltage battery 114 or the low-voltage battery 116 of FIG. 1).

The first electric path 241 may allow for the flow of current in accordance with an AC level 1 charging method. For example, under the AC level 1 charging method, the charging station system 120 may provide the electric vehicle 110 with about 120 V AC, 1-phase with less than about 20 amps (A) (e.g., 12A or 16A). The second electric path 241 may serve as a neutral electric path or allow for the flow of current in accordance with an AC level 2 charging method. For example, under the AC level 2 charging method, the charging station system 120 may provide the electric vehicle 110 with about 208 to 240 V AC, 1-phase with less than about 80 A. The third electric path 243 allow the flow of current between the charging station system 120 and a chassis ground during charging. The fourth electric path 244 may communicate control signals between the charging station system 120 and the vehicle 110. The fifth electric path 244 may allow the electric vehicle 110 to detect presence of the coupler 130.

The coupler 130 may include a status indicator 250 electrically connected to the first and second electric paths 241 and 242 and configured to visually communicate whether current is flowing through the first and second electric paths 241 and 242. In one embodiment, the status indicator 250 provides (e.g., to a technician or driver) a visual indication (e.g., a light) indicative of whether current is flowing through the first and second electric paths 241 and 242. It should be understood that the coupler 130 may also include one or more status indicators connected to the first, second, third, fourth, or fifth electric paths 241, 242, 243, 244, 245 to provide a visual indication (e.g., a light) indicative of whether current is flowing through the corresponding electric path.

The electric vehicle 110 may include a status indicator 252 communicatively coupled to an electric vehicle charge controller 255 (having processor 253 and memory device 254) of the electric vehicle 110 to provide a visual indication indicative of the charge status. For example, the status indicator 252 may display a first visual indication while the electric vehicle is being charged and a second visual indication when the charging is complete. The electric vehicle charge controller 255 may be communicatively coupled to the charger 247 and receive an indication of the charging progress from the charger 247. The electric vehicle charge controller 255 may cause the status indicator 252 to display the first or second visual indication based on the indication of the charging progress.

The electric vehicle charge controller 255 may be communicatively coupled to a buffer 256, which is communicatively coupled to the control system 170 by way of the fourth electric path 244 and the fourth contact point 234. The electric vehicle 110 may include an isolation monitor 257 connected to the first and second electric paths 241 and 242 between the charger 247 and the battery 248. In one embodiment, the isolation monitor 257 may monitor and detect electric parameters (e.g., current, voltage, resistance, and the like) between the charger 247 and the battery 248.

In one embodiment, the third electric path 243 electrically connects the coupler 130 and the electric vehicle 110 to ground 258. The charging station system 120 may include a ground path 260 that provides a ground for current flowing along the third electric path 243. In one embodiment, the charging station system 120 includes a first switch 261, the electric vehicle 110 includes a second switch 262, and the coupler 130 includes a third switch 263 (e.g., the switch 138 of FIG. 1). The first switch 261 may be connected along the fourth electric path 244 in series to a first resistor 271 of the electric vehicle 110. The fourth electric path may communicate a control signal, such as a square wave (e.g., pulse-width modulation) from the control system 170 to the electric vehicle charge controller 255 of the electric vehicle 110.

A second and third resistor 272 and 273 of the electric vehicle may be electrically connected in parallel to the third electric path 243 and the fourth electric path 244. A fourth resistor 274 of the electric vehicle 110 may be connected to the fifth electric path 245 and a regulated voltage output (e.g., 5-volt output). The vehicle inlet 229 may include a fifth resistor 275 along the sixth electric path 246 positioned between the third electric path 243 and the fifth electric path 245. The coupler 130 may include a sixth resistor 276 along the fifth electric path 245 between the third electric path 243 and the fifth contact point 235. Additionally, the coupler 130 may include a seventh resistor 277 connected in parallel to the third switch 263 along the fifth electric path 245. The electric vehicle 110 may include a transient-voltage-suppression (TVS) diode 280 connected in parallel to the second and third resistor 272 and 273. The third electric path 243 may include a ground 282 between the TVS diode 280 and the second resistor 272.

As discussed herein, aspects of the present disclosure provide embodiments for signaling to the electric vehicle 110 that the third switch 263 (e.g., switch 138 of FIG. 1) has been actuated earlier than using existing approaches. As discussed herein, when the third switch 263 is engaged (e.g., toggled), the voltage along the fifth electric path 245 may change (e.g., rise), causing a change in current that may be detectable by the electric vehicle charge controller 255 of the electric vehicle 110. In response, the electric vehicle charge controller 255 causes the charger 247 to initiate stopping the charging process by to ramp down the electric current to zero amps, for example, in about 100 milliseconds (ms), as discussed above. By causing the circuit associated with the third switch 263 to be actuated earlier, the present disclosure allows the initiation of the stopping of the charging process to occur earlier than using existing approaches. In this manner, the current flowing between the coupler and the electric vehicle may have stopped flowing by moment the couple becomes removable from the vehicle, thereby preventing arcing, preserving resistor lifespan, and reducing maintenance of the electric vehicle 110 and charging station system 120.

FIG. 3A is a schematic diagram of the coupler 130 having components arranged in a first configuration 300 within an electric vehicle management system 100, in accordance with aspects of the technology described herein. In one embodiment, the coupler 130 corresponds to the coupler of FIGS. 2C and 2D arranged in accordance with the SAE J1772 standard. However, it should be understood that the coupler 130 can comply with any other suitable standard.

As illustrated, the coupler 130 may include a sensor assembly 134 positioned on or within the button 132. In one embodiment, the sensor assembly 134 is positioned on the surface of the button 132, within an opening on the surface of the button 132, under the surface of the button 132, or a combination thereof. The sensor assembly 134 may include a protective housing, such as a clear casing. It should be understood that the sensor assembly 134 may be oriented in any specific angle relative to the surface of the button 132 to optimize detection of the external object (e.g., hand). In one embodiment, the sensor assembly 134 is additionally or alternatively positioned on the electric vehicle 110 (e.g., on an electric inlet of the electric vehicle 110.

The sensor assembly 134 and the relay 140 may be communicatively coupled to the relay controller 150. As discussed above, the relay 140 may be connected in series to the switch 138 (e.g., the third switch 263 of FIG. 2D). As illustrated, the relay 140 and switch 138 may be connected in series with respect to a first electric path 310 and a second electric path 312. In embodiments in which the switch 138 remains closed (e.g., to close the circuit), the relay 140 may be positioned in series with the switch 138. In such an embodiment, the relay 140 may be connected in series with the switch 138 along the first electric path 310 and the second electric path 312. In one embodiment, the first electric path 310 and the second electric path 312 correspond to the fifth electric path 245 (of FIG. 2D). For example, the first electric path 310 may lead to the electric vehicle 110 (e.g., via the third or fifth electric path 243 or 245 of FIG. 2D). The second electric path 312 may lead to the ground 258 (FIG. 2D) or a power grid (e.g., via the third electric path 243), and/or may lead to the fifth electric path 245 (illustrated as "to PP").

In one embodiment, the sensor assembly 134 may include the capacitive electrode 136 (of FIG. 1) and corresponding integrated circuit (IC). In one embodiment, the sensor assembly 134 may include the force sensor (or any of the above-referenced sensors) and corresponding integrated circuit (IC). As discussed above, the sensor assembly 134 may include any suitable sensor configured to detect presence of an external object (e.g., such as the driver's hand). As discussed above, the sensor assembly 134 may detect the external object, such as a driver's hand, before the external object (e.g., hand) engages with (e.g., contacts) the coupler 130 or the button 132 of the coupler 130. The sensor assembly 134 may communicate to the relay controller 150 a sensor signal indicative of the detection of the presence of the external object. In response, the relay controller 150 may engage the relay 140 to cause a modification in resistance across the first electric path 310 or the second electric path 312 that is detected by the electric vehicle charge controller (e.g., as a change in current or a change in voltage) to initiate stopping of the charging process. In this manner, the charging process may be stopped before the external object has a chance to contact the coupler 130 to mechanically decouple the coupler 130 from the electric vehicle 110.

In response to the button 132 being depressed, a first portion 302 of the button 132 may be lowered or displaced in a downward direction (e.g., toward the body of the coupler) and a second portion 304 may be raised or displaced in an upward direction (e.g., away from the body of the coupler 130). The first portion 302 of the button 312 may be positioned farther away, than the second portion 304, from the electric terminals 222 of the coupler 130. In one embodiment, depressing the button 132 causes the first portion 302 and the second portion 304 to rotate about pivot 306 along rotation direction 308. The button 132 may be rotatably coupled to the handle portion 221 about the pivot point of contact 306. As a result of the button depression, the second portion 304 may rise, thereby mechanically disengaging the latch 220 of the coupler 130 from the electric vehicle 110. Similarly, depressing the button 132 may engage the switch 138 to cause the modification in resistance across the first electric path 310 or the second electric path 312 that is detected by the electric vehicle charge controller (e.g., as a change in current or a change in voltage) to initiate stopping of the charging process.

Turning to FIG. 3B, illustrated is a schematic diagram of the coupler 130 having internal components arranged in a second configuration 320 within an electric vehicle management system 100, in accordance with aspects of the technology described herein. As compared to the first configuration 300 of FIG. 3A, the illustrated embodiment includes the sensor assembly 134 positioned on the handle portion 221, whereas the sensor assembly 134 is positioned on the button 132 in the first configuration 300. It should be understood that the coupler 130 may include sensors of the sensor assembly 134 on the handle portion 221, on the button 132, on the cable 160, or any other suitable position. Additionally, in one embodiment, the sensor assembly 134 may additionally or alternatively be positioned on the electric vehicle 110 (e.g., on an electric inlet of the electric vehicle 110).

In one embodiment, the sensor assembly 134 may be positioned on or within the handle portion 221. In one embodiment, the sensor assembly 134 is positioned on the surface of the handle portion 221, within an opening on the surface of the button 132, under the surface of the button 132, or a combination thereof. The sensor assembly 134 may include a protective housing, such as a clear casing. The protective housing may extend out of the handle portion 221 and surround the sensor assembly 134. It should be understood that the sensor assembly 134 may be oriented in any specific angle relative to the surface of the button 132 to optimize detection of the external object (e.g., hand). By having a sensor assembly 134 on the handle portion 221, the relay controller 150 may be able to more quickly electrically decouple the coupler 130 and the electric vehicle 110.

With reference to FIG. 2D and by having a sensor assembly 134 on the handle portion 221, the sensor assembly 134 may send a sensor signal indicative of the detected external object to cause the relay controller 150 to send a charging control signal to initiate stopping the charging process. In one embodiment, sending the charging control signal causes the relay 140 to change a resistance across the fifth electric path 245 before the third switch 263 is engaged. In this manner, by detecting the external object, the charging control signal causes the electric vehicle charge controller 255 to cause the charger 247 (of FIG. 2D) to ramp down the current to zero amps, for example, in less than one second (e.g., about 100 ms), as discussed above. By causing the charger 247 to step down the current before the external object contacts the coupler, the flow of current between the coupler 130 and electric vehicle 110 may be cut off to ensure that the coupler 130 is removable from the electric vehicle 110 without arcing occurring.

Figure 3C:
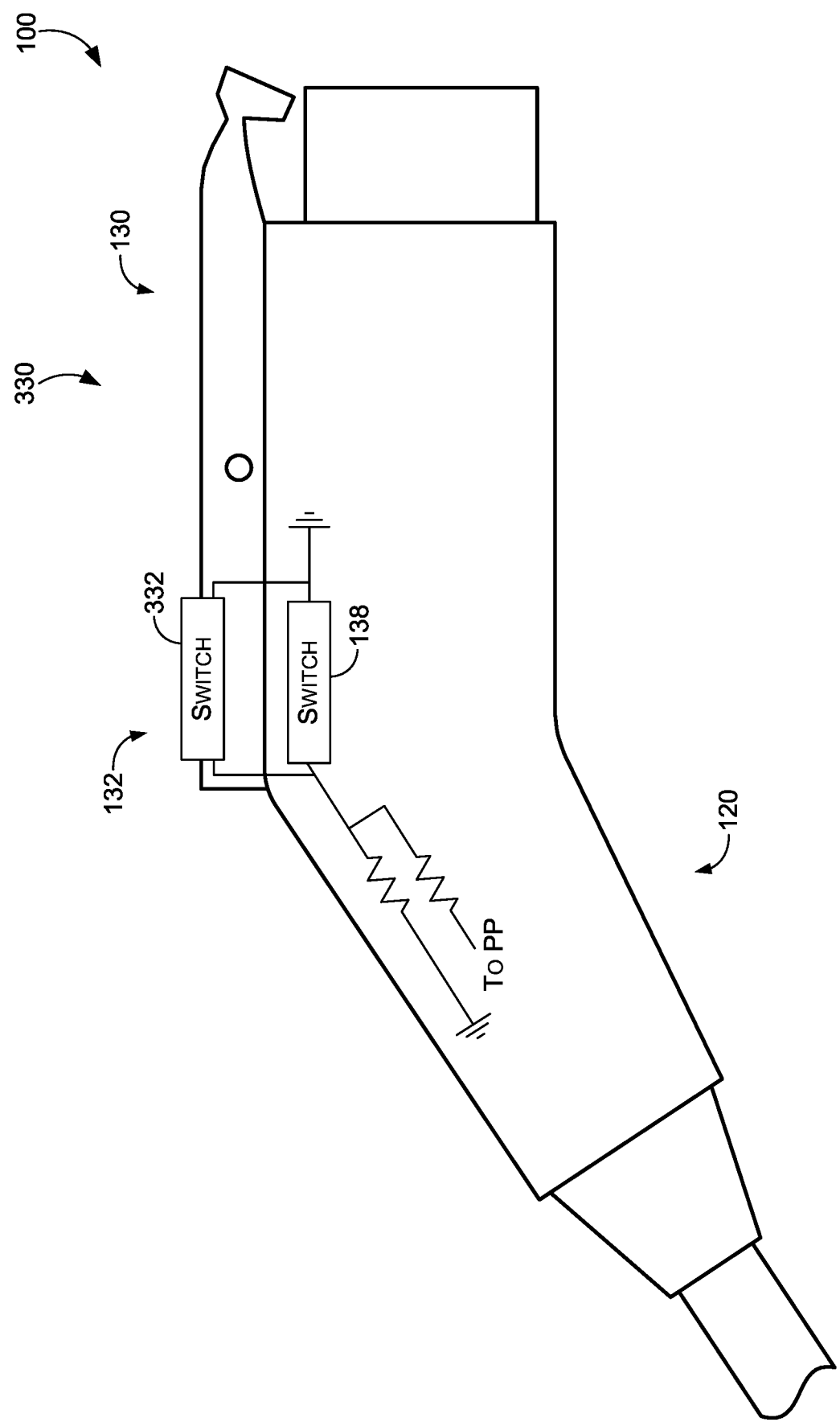
FIG. 3C is a schematic diagram of the internal components of the coupler arranged in a third configuration within an electric vehicle management system, in accordance with aspects of the technology described herein; a FIG. 4 is a flow diagram of an exemplary method for sending a charging control signal to initiate stopping of a charging process between a charging station system and an electric vehicle, in accordance with aspects of the technology described herein.

FIG. 3C is a schematic diagram of the internal components of the coupler 130 arranged in a third configuration 330 within an electric vehicle management system 100, in accordance with aspects of the technology described herein. As compared to the first and second configuration 300 and 302 of FIGS. 3A and 3B, respectively, the illustrated embodiment omits the sensor assembly 134 and the relay controller 150. Instead, the third 330 of the coupler 130 may include an additional switch 332. In one embodiment, the additional switch 332 is connected in parallel to the switch 138 (e.g., third switch 263 of FIG. 2D).

In embodiments in which the switch 138 remains closed (e.g., to close the circuit), the additional switch 332 may be positioned in series with the switch 138. As a result of this arrangement, whichever switch is toggled first, may cause a change in resistance, which is detected by the electric vehicle charge controller 255 (FIG. 2D) to initiate stopping of the charging process by reducing flow of current between the electric vehicle 110 and the coupler 130. For example, if the additional switch 332 is toggled (e.g., by a driver's hand) before the switch 138, the additional switch 332 may cause the current to ramp down to zero amps. By causing the circuit associated with the additional switch 332 to be actuated earlier, the electric vehicle charge controller 255 may initiate stopping of the charging process earlier than under existing approaches. In this manner, the flow of current between the coupler 130 and electric vehicle 110 may be cut off before the latch 220 (FIG. 2C) is released to make the coupler 130 removable from the electric vehicle 110.

In one embodiment, the additional switch 332 is positioned on the button 132, such that the additional switch 332 may be toggled before the button 132 is fully depressed to toggled the switch 138. As discussed above, a driver wishing to disconnect the coupler 130 from the electric vehicle may apply a force to (e.g., grab and/or pull) the coupler from the electric vehicle 110. For example, the force that causes the button 132 to depress to release the latch 220 and engage the switch 138 may be more than the force that causes the additional switch 332 to be engaged. Accordingly, the additional switch 332 may be toggled before the button 132 is depressed enough to toggle the switch 138. It should be understood that the additional switch 332 may be positioned in any alternative position, such as the handle portion 221, for example. Additionally, the coupler 130 may include two or more of additional switches 332 that may each be positioned in parallel with each other and the switch 138. By omitting the control system, the third configuration 330 provides an example of a solution that avoids employing a charging control signals from the control system. Instead, the third configuration 330 allows for quick electrical decoupling based on a force being applied to the additional switch 332.

Instead of or in addition to having the additional switch 332, the coupler 130 may include a mechanical assembly that delays depression of the button. In one embodiment, the mechanical assembly may include a passive mechanical device, such as a dashpot to delay depression of the button 132. For example, the dashpot may cause a delay (e.g., slowing) in depression of the button, such that the button 132 may engage the switch 138 to cause a modification in resistance associated with a corresponding electric path, such that the modification in resistance is detected by the electric vehicle charge controller 255 to initiate stopping of the charging process. Slowing the depression of the button 132 may release the latch 220 after the electric vehicle charge controller 255 detects the modification of the resistance. The initiation of the charging process may occur before the button 132 fully depresses to release the latch 220, making the coupler 130 removable from the electric vehicle 110.

In one embodiment, the mechanical assembly may include an active mechanical device, such as a cam system to delay depression of the button 132. The cam system may include a cylindrical cam, a face cam, a heart shaped cam, a snail drop cam, a linear cam, and the like. The cam system may be positioned within the handle to slow the depression of the button 132. The cam system may be actuated (e.g., electrically actuated) in response to depressing or initiating depression of the button. Slowing the depression of the button causes the latch to release after the electric vehicle charge controller 255 detects the modification of the resistance to initiate stopping of the charging process.

Figure 4:
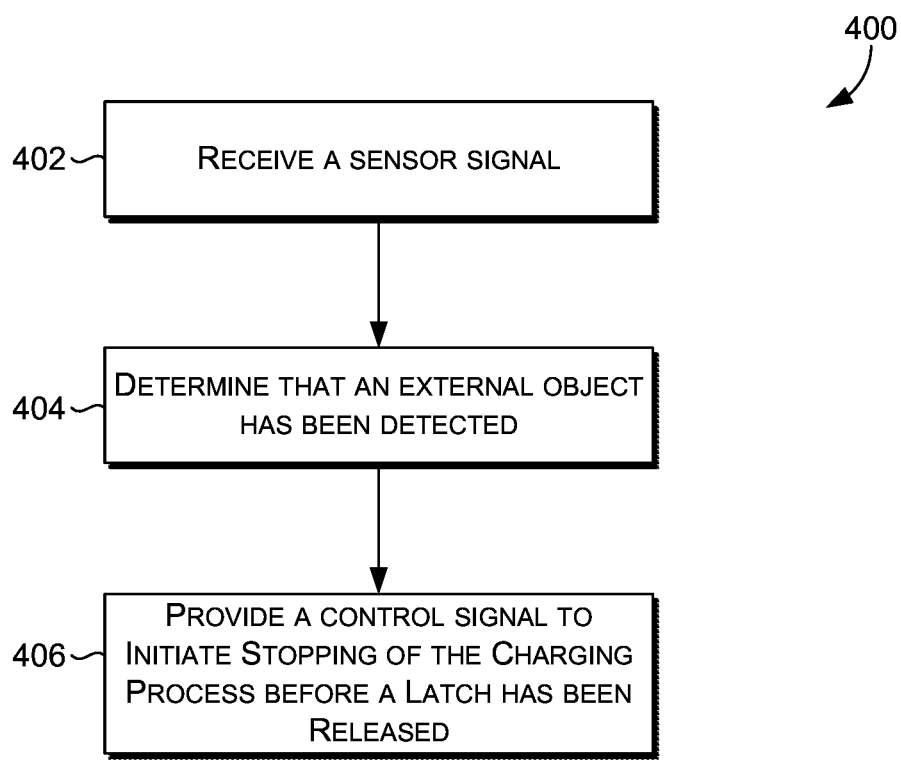

FIG. 4 is a flow diagram of an exemplary process for sending a charging control signal to cause the charging process to initiate stopping by controlling a current flow between the charging station system 120 (FIGS. 1-3) and an electric vehicle 110 (FIGS. 1-2), in accordance with aspects of the technology described herein. Process 400 includes receiving (block 402) a sensor signal. As discussed above, the sensor signal may be determined and sent by sensor assembly 134 (FIGS. 1-3). Based on the sensor signal, process 400 includes determining (block 404) that an external object has been detected. In one embodiment, determining (block 404) that the external object has been detected includes determining that the external object is X-distance away from the sensor assembly. In one embodiment, the determining the state includes comparing the distance of the external object relative to a threshold distance away from the sensor assembly.

Process 400 may include, based on the sensor signal, providing (block 406) a charging control signal to initiate stopping of the charging process before a latch 220 (FIG. 2C) has been released. In one embodiment, the charging control signal is provided to the electric vehicle charging controller 255 (FIG. 2D) to initiate stopping of the charging process. As discussed above, providing the charging control signal includes actuating the relay to modify a resistance across a corresponding electric path. The electric vehicle charge controller 255 may detect this resistance modification to initiate stepping down the current flowing between the coupler 130 and the electric vehicle 110. For example, the charging control signal may actuate the relay 140, which changes the current flowing through the corresponding flow path (e.g., the third electric path 243 (FIG. 2D) or the first electric path 310 (FIG. 3)). By changing the flow of current, actuation of the relay 140 can cause a change in resistance that is detected by the electric vehicle charge controller 255, which causes the current flowing between the electric vehicle 110 and the coupler 130 to ramp down to zero amps. As discussed above, the charging control signal may be sent in response to receiving the sensor signal or determining the he external object is at least the threshold distance away from the sensor assembly.

The process 400 may be performed by any suitable component of the electric vehicle management system 100. For example, the relay controller 150 (FIG. 1), the control system 170 (FIG. 1), and/or the electric vehicle charge controller 255 (FIG. 2D). Although process 400 of FIG. 4 is discussed as being performed by the electric vehicle management system 100 of FIGS. 1-3, it should be understood that any suitable component capable of processing computer-readable instructions may be configured to perform these processes.

Example Electric Vehicle System

Figure 5:
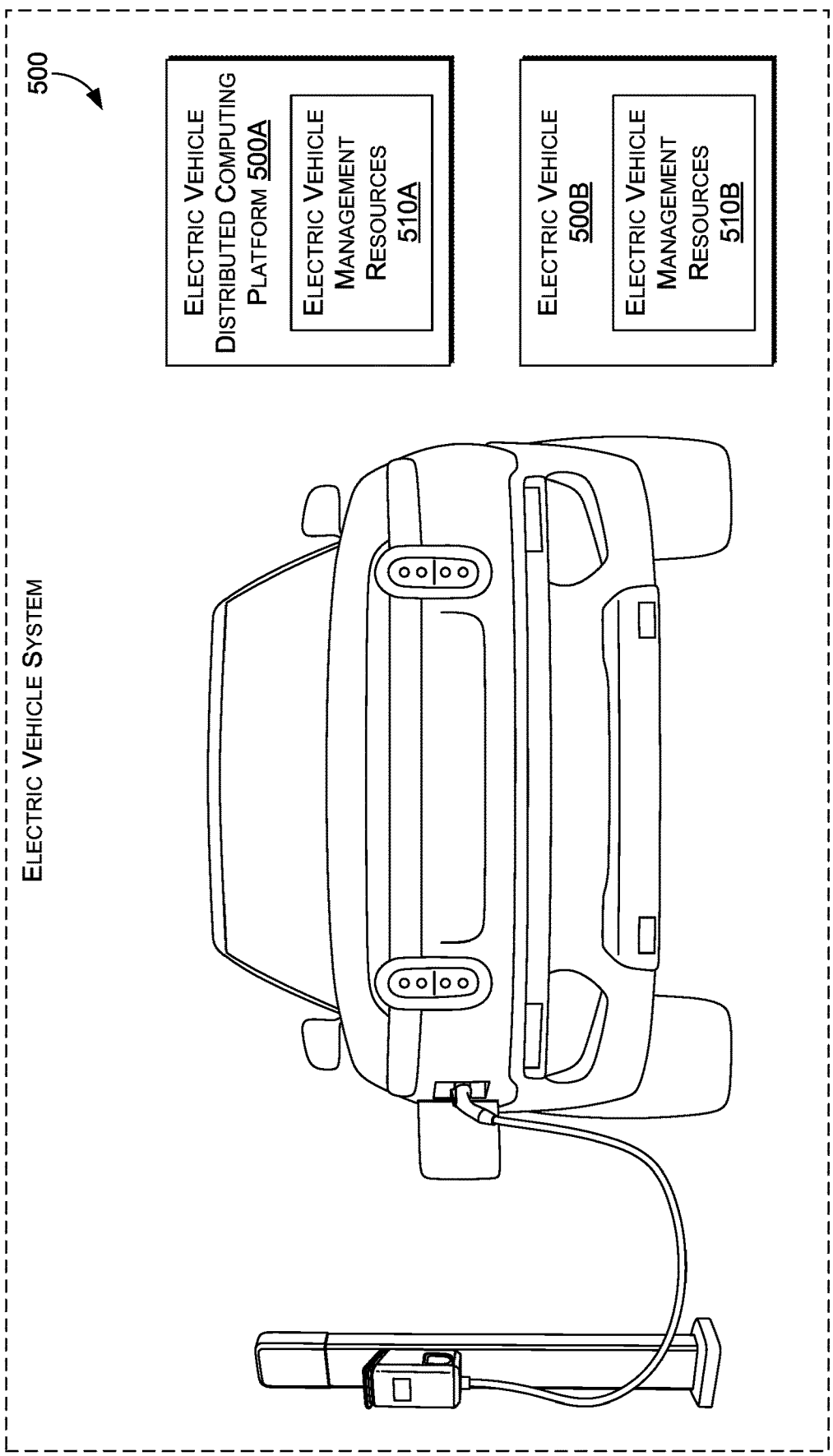
FIG. 5 is a schematic diagram of an example electric vehicle system, in accordance with aspects of the technology described herein.

With reference to FIG. 5, FIG. 5 illustrates an example electric vehicle system 500 in which implementations of the present disclosure may be employed. In particular, FIG. 5 shows a high level architecture of an example electric vehicle distributed computing platform 500A and electric vehicle 500B having electric vehicle management resources 510A and electric vehicle management resources 510B, respectively, that support the functionality described herein. The electric vehicle system 500 can host a technical solution environment, or a portion thereof.

The electric vehicle distributed computing platform 500A includes electric vehicle management resources 510A that provide and support electric vehicle distributed computing systems and operations. Electric vehicle distributed computing platform 500A can run cloud services across different data centers and geographic regions. Typically the electric vehicle distributed computing platform 500A acts to store data or run service applications in a distributed manner. For example, a service application can be supported a computing environment (e.g., host, node, and virtual machine) and resources (e.g., hardware resources and software resources) that are configured the service application; and a client device may be linked to a service application and configured to issue commands to the service application. Communications in the electric vehicle distributed computing platform 500A are performed through a virtual Internet Protocol (IP) and over a network (not shown), which may include, without limitation, one or more local area networks (LANs) and/or wide area networks (WANs).

The electric vehicle 500B includes electric vehicle management resources 510B that provide and support electric vehicle systems and operations. Electric vehicle 500B can refer to a vehicle that uses electric power. The electric vehicle 500B can be built on a configuration for an automotive chassis used for automotive platforms of battery electric vehicles. The configuration can include a base structure that houses the batteries, electric motors, and other electronic components of the electric vehicle. By way of example, the electric vehicle can include a steering system, brake sensor system, and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display @ 134 and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) @126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 5 is merely meant to illustrative of an example electric vehicle and electric vehicle system that can be used in connection with one or more embodiments of the present invention.

Example Computing Environment

Figure 6:
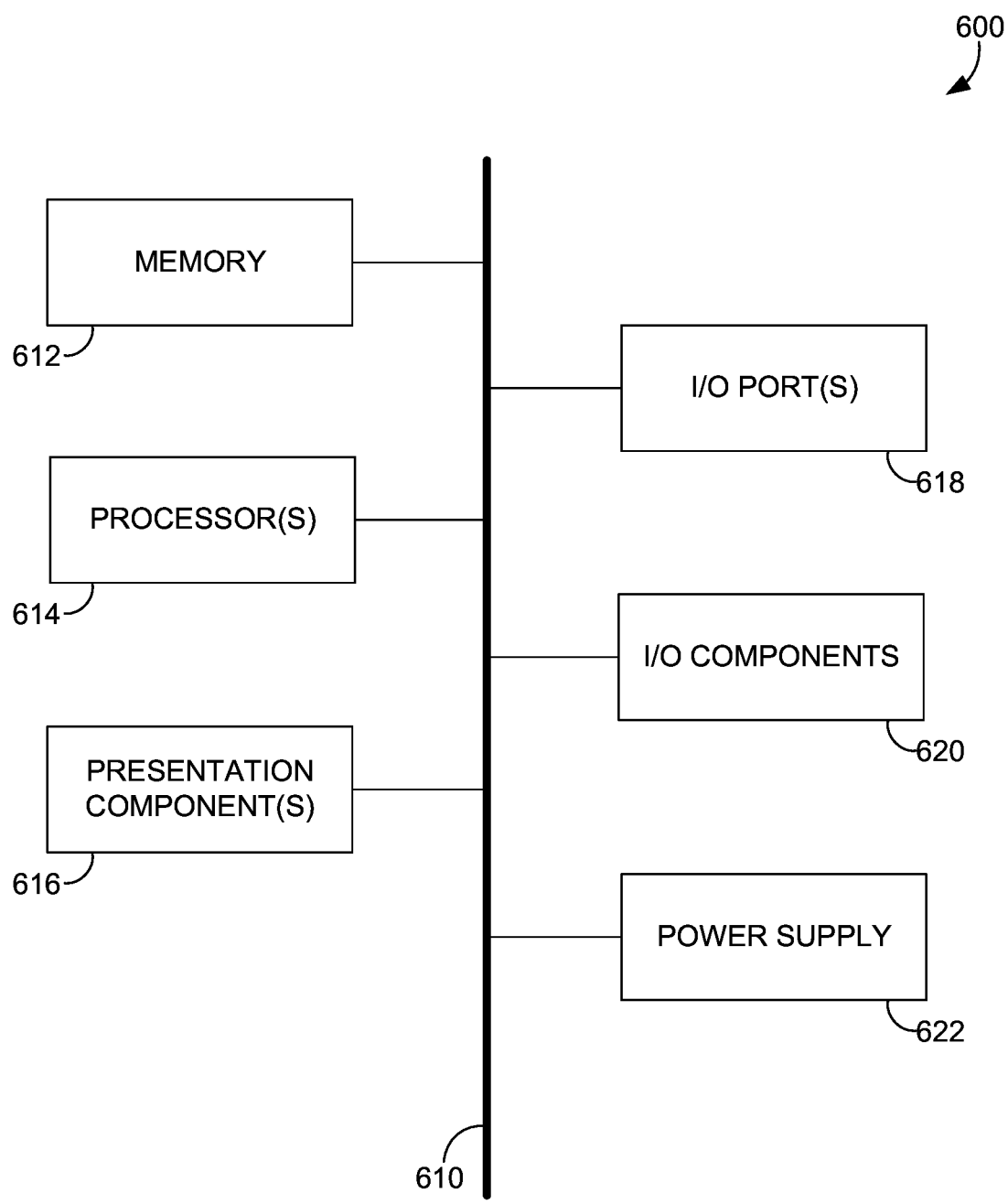
FIG. 6 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more buses (such as an address bus, data bus, or combination thereof). The various blocks of FIG. 6 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 6 is merely illustrative of an example computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system, comprising:
   a sensor assembly configured to detect an external object before or when the external object contacts the system;
   a latch configured to couple the system to a vehicle;
   a relay controller configured to receive, from the sensor assembly, a sensor signal being indicative of the detection of the external object and used to provide a charging control signal to an electric vehicle charge controller before the latch mechanically decouples the system from a vehicle; and
   a relay to electrically decouple a coupler from the vehicle for a period of delay before the coupler mechanically decouples from the vehicle, wherein the period of delay is at least 100 milliseconds (ms).

2. The system of claim 1, wherein the relay controller is configured to: in response to receiving the sensor signal, provide the charging control signal to the electric vehicle charge controller to initiate the stopping of the charging process.

3. The system of claim 2, wherein providing the charging control signal to the electric vehicle charge controller causes the vehicle to stop the charging process before the latch mechanically decouples the system from the vehicle.

4. The system of claim 1, further comprising:
   a switch that is engageable to initiate the stopping of the charging process, the switch being engageable through depression of a button; and the relay electrically connected in series to the switch.

5. The system of claim 4, wherein providing the charging control signal comprises actuating the relay to modify a resistance across a corresponding electric path, the resistance modification being detected by the electric vehicle charge controller.

6. The system of claim 4, comprising a handle portion that comprises the button configured to engage with the switch in response to a force being applied to the button, wherein engaging the switch causes the switch to initiate the stopping of the charging process.

7. The system of claim 6, wherein the button is depressible at a first portion positioned away from an electrical terminal of the system relative to a second portion of the button, wherein depressing the first portion of the button causes the button to pivot about a pivot point of contact with the handle portion of the system to cause the second portion of the button to raise at a direction opposite to the direction at which the first portion is depressed, wherein raising the second portion of the button mechanically disengages the system from the vehicle.

8. The system of claim 1, comprising a handle portion, wherein at least one of the sensor assembly or the relay is housed within or on the handle portion or on a button, wherein the sensor assembly comprises at least one of a proximity sensor, an accelerometer, a capacitive electrode, a force sensor, a pneumatic sensor, a magnetic sensor, or a capacitive sensor.

9. A charging station system, comprising:
a coupler;
a latch configured to couple the coupler to a vehicle;
a sensor assembly configured to detect an external object before the external object contacts the coupler; and
a relay controller configured to receive, from the sensor assembly, a sensor signal being indicative of the detection of the external object and used to provide a charging control signal to an electric vehicle charge controller to electrically decouple the coupler from the vehicle to initiate stopping of a charging process for a period of delay before the latch mechanically decouples the coupler from the vehicle, wherein the period of delay is at least 100 milliseconds (ms).

10. The charging station system of claim 9, wherein the relay controller is configured to: in response to receiving the sensor signal, provide the charging control signal to the electric vehicle charge controller to initiate the stopping of the charging process.

11. The charging station system of claim 10, wherein providing the charging control signal to the electric vehicle charge controller causes the vehicle to stop the charging process before a latch of the coupler mechanically decouples the coupler from the vehicle.

12. The charging station system of claim 9, further comprising:
a switch that is engageable to initiate the stopping of the charging process, the switch being engageable through depression of a button; and
a relay electrically connected in series to the switch.

13. The charging station system of claim 12, comprising a handle portion that comprises the button configured to engage with the switch in response to a force being applied to the button, wherein engaging the switch causes the switch to initiate the stopping of the charging process.

14. The charging station system of claim 13, wherein the button is depressible at a first portion positioned away from an electrical terminal of the coupler relative to a second portion of the button, wherein depressing the first portion of the button causes the button to pivot about a pivot point of contact with the handle portion of the coupler to cause the second portion of the button to raise at a direction opposite to the direction at which the first portion is depressed, wherein raising the second portion of the button mechanically disengages the coupler from the vehicle.

15. A coupler configured to couple to a vehicle to initiate a charging process, the coupler comprising:
a latch configured to selectively couple to the vehicle;
a switch engageable to modify a resistance across a corresponding electric path, the modification of the resistance being detectable by an electric vehicle charge controller to initiate stopping of the charging process;
a button configured to engage with the switch in response to depressing the button, wherein depressing the button releases the latch to allow removal of the coupler from the vehicle;
a relay to electrically decouple the coupler from the vehicle before the coupler mechanically decouples from the vehicle; and
a mechanical assembly comprising a dashpot positioned on the button to slow the depression of the button, wherein slowing the depression of the button releases the latch after the electric vehicle charge controller detects the modification of the resistance.

16. The coupler of claim 15, comprising a handle, wherein the mechanical assembly comprises a cam system positioned within the handle to slow the depression of the button by way of electrical actuation, wherein slowing the depression of the button releases the latch after the electric vehicle charge controller detects the modification of the resistance.

17. The coupler of claim 15, wherein the button is depressible at a first portion positioned away from an electrical terminal of the coupler relative to a second portion of the button, wherein depressing the first portion of the button causes the button to pivot about a pivot point of contact with a handle portion of the coupler to cause the second portion of the button to raise at a direction opposite to the direction at which the first portion is depressed, wherein raising the second portion of the button mechanically disengages the coupler from the vehicle.

* * * * *